3,720,721
HALOGENATED BIPHENOLS AND METHODS FOR
PREPARING THE SAME
Hans-Dieter Becker, Goteborg, Sweden, and Alfred R. Gilbert, Schenectady, N.Y., assignors to General Electric Company
No Drawing. Filed July 9, 1970, Ser. No. 53,648
Int. Cl. C07c 39/12
U.S. Cl. 260—620                               13 Claims

ABSTRACT OF THE DISCLOSURE

Halobiphenols can be produced from precursor diphenoquinones by effecting reaction between the diphenoquinone and a hydrogen halide, such as hydrogen chloride, while the diphenoquinone is suspended in a liquid medium of the class of water, lower alkanols and mixtures of water and said alkanols. The biphenols thus obtained can be used as antioxidants or as intermediates in the preparation of other diphenoquinones and polymeric compositions useful in the coating and insulating arts.

---

This invention is concerned with halobiphenols and methods for making the same from precursor diphenoquinones. More particularly, the invention is concerned with a process which comprises (1) forming a suspension of a tetra-organo-substituted diphenoquinone (hereinafter referred to generically as the "diphenoquinone") of the general formula (I)
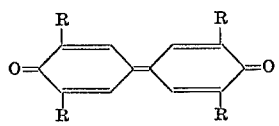

in a liquid medium selected from the class consisting of water, lower alkanols of 1 to 4 carbon atoms, and mixtures of water and said alkanols, and (2) introducing into the suspension a hydrogen halide of the formula (II)                           HX to obtain a monohalogenated biphenol (hereinafter designated as "halobiphenol"). Included among such halobiphenols obtainable by our process are those of the general formula (III)
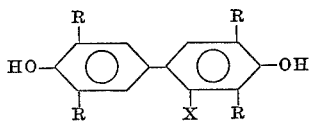

In the above formulas, R may be the same or different monovalent hydrocarbon radicals of from 1 to 6 carbon atoms, and X is a halogen, for example, chlorine, bromine, fluorine. The invention also includes halodiphenoquinones, halobiphenols and polymeric compositions derived from such halobiphenols.

It is known (see Ann. 210, 133 [1882] and American Chemical Journal 14, No. 8, page 553 [1892] that gaseous hydrogen chloride will react with benzoquinone in a 5% $CHCl_3$ solution to give good yields of practically pure chlorohydroquinone. However, if gaseous hydrogen chloride is reacted with tetramethyl diphenoquinone under the same conditions, a dark-colored mixture of products is obtained, including an insoluble quinhydrone, with much of the diphenoquinone being unreacted. If one attempts to prepare tetra-organo-substituted monochlorobiphenols by conventional means, for example, by the reaction of stoichiometric amounts of chlorine with the tetrasubstituted biphenols, the chlorination can result not only in mono- or poly-chlorination of the aryl nuclei, but it can also, and often does, result in chlorine substitution on the organic substituent groups on the biphenol, thus greatly complicating the isolation of the monochlorotetrasubstituted biphenol and also leading to reduction in the yield of the latter more desirable product; thus, the direct chlorination leads to excessively complex mixtures of ingredients.

It has also been reported [see Ber. 38, 226 (1905)] that 3-chloro-2,2′,6,6′-tetramethyl-p,p′-biphenol can be prepared by the reaction of concentrated aqueous hydrochloric acid (37% HCl) with a hot acetic acid solution of 3,3′,5,5′-tetramethyldiphenoquinone. Although good yields of the biphenol are obtained, nevertheless excessively large amounts of rather expensive solvent (acetic acid) are required. If the reaction of the concentrated aqueous hydrochloric acid is carried out with a suspension of the same tetramethyldiphenoquinone in acetic acid, a dark colored product is obtained which after numerous recrystallizations yields a mixture of biphenols of which only 20% is the desired monochlorotetramethyl biphenol and 50% is the unhalogenated biphenol.

Unexpectedly, we have discovered that we can readily prepare halo-substituted hydrocarbon-substituted biphenols by effecting reaction between a hydrogen halide and a suspension of the corresponding tetra-hydrocarbon-substituted diphenoquinone in which the suspending medium is a liquid selected from the class consisting of water, alkanols of 1 to 4 carbon atoms, and mixtures of water and these alkanols. In addition to using relatively inexpensive solvents (alkanols and water), this reaction can take place within a relatively short period of time, generally in a matter of minutes to less than an hour, while at the same time proceeding at a relatively low temperature in the order of about 20° to 125° C. The yields of the biphenol obtained by means of our process are usually in excess of 75% of the theoretical yield, and for the most part exceed 90 to 95% of the theoretical value of the desired halogenated hydrocarbon-substituted biphenol. Furthermore, the purity of the desired product is quite high after the initial reaction, thus significantly reducing the number and complexity of the processing steps required to isolate the pure product. What is equally important is that complicating quinhydrone formation is substantially repressed and the use of expensive acids, such as acetic acid, is avoided.

The halobiphenols obtained herein can be used as antioxidants for petroleum products, such as gasoline, and as stabilizers against polymerization of monomeric materials to maintain them in the essentially unpolymerized state until such time as they are ready for polymerization, for instance, with an organic peroxide. In addition, the halobiphenols can be reacted with isophthaloyl or terephthaloyl halides to make polymers in accordance with the procedures described in U.S. Pats. 3,036,990–992, issued May 29, 1962, and U.S. Pats. 3,160,602–605, issued Dec. 12, 1964, in the names of S. W. Kantor and F. F. Holub, all assigned to the same assignee as the present invention. The aromatic polyester thus obtained can be used for making films and fibers, and can also be employed for making solutions of such polymers and thereafter coated on electrical conductors to form high temperature insulation. The presence of halogen in the dihydric biphenyl reactant imparts improved flame-resistance to such polymers. Other polyesters can be made by the reacting the halobiphenols with aliphatic dicarboxylic acids, or acyl halides thereof, such as adipic acid, sebacic acid, adipoyl chloride, etc.

Alternatively, polycarbonate resins suitable for molding and films can be obtained in accordance with the methods outlined in U.S. 3,022,272, issued Feb. 20, 1962, and U.S. 3,018,365, issued Apr. 3, 1962, by treatment of the halobiphenols with a phosgenating agent, e.g., diphenyl carbonate, $CoCl_2$, chloroformate, etc.

Among the monovalent hydrocarbon radicals which R may represent are, for example, methyl, ethyl, propyl, isopropyl, butyl, isobutyl, t-butyl, n-amyl, phenyl, etc. Preferably, R is the same or different radical of from 1 to 6 carbon atoms.

Included among the diphenoquinones which may be employed in the practice of many of the aspects of the present invention may be mentioned 3,3',5,5'-tetra-t-butyldiphenoquinone-4,4';
3,3',5,5'-tetramethyldiphenoquinone-4,4';
3,3',5,5'-tetraisopropyldiphenoquinone-4,4';
2,2'-dichloro-3,3',5,5'-tetramethyldiphenoquinone-4,4';
2,2',3,3',5,5'-hexaphenyldiphenoquinone-4,4';
2-chloro-3,3',5,5'-tetramethyldiphenoquinone-4,4';
2-bromo-3,3',5,5'-tetraphenyldiphenoquinone-4,4';
3,5'-dimethyl-3',5-diphenyldiphenoquinone-4,4'; etc.

More particular directions for preparing these starting diphenoquinones may be found in the patent of Allan S. Hay, U.S. 3,306,875, issued Feb. 28, 1967, and assigned to the same assignee as the present invention.

Our process for converting diphenoquinones to the halobiphenols can also be used in purifying the effluent reaction product obtained from the oxidation of phenols described in the aforementioned Hay patent. More particularly, it has been found that when making, for instance, polymers from 2,6-dimethylphenol or 2,6-diphenylphenol, in accordance with the above-mentioned Hay patent, from about 0.5 to as high as 5% of the reaction product is in the form of the corresponding diphenoquinone. We have found that by treating the reaction mixture with a gaseous hydrogen halide, it is possible to separate more easily the desired polymeric reaction product in essentially the same optimum yield and also obtain, with a minimum of processing, both the polyphenylene oxide and the corresponding halobiphenol more particularly described in the present invention. The treatment of such polymeric effluents is more particularly disclosed and claimed in our copending application Ser. No. 53,649, filed concurrently herewith and assigned to the same assignee as the present invention and now Pat. No. 3,637,593.

The hydrogen halide for convenience is advantageously added in the gaseous form, although aqueous solutions, including concentrated aqueous halide solutions may be used. The hydrogen halide is advantageously passed into a suspension (which includes suspension-solutions) of the diphenoquinone in either the water or the alkanol until completion of the reaction, which state may be indicated by attainment of a colorless or lightly colored reaction mixture (as contrasted to an initially more colored starting mixture). Among the alkanols which may be employed as the dispersing medium are the lower alkanols of from 1 to 4 carbon atoms, e.g., methanol, ethanol, propanol, isopropanol, butanol, ethylene glycol, etc. Other inert solvents for either the hydrogen halide or diphenoquinone, e.g., dioxane, chloroform, etc., can be used in combination with the water or alkanol, or both, without departing from the scope of the invention. The amount of water and alkanol in mixtures of the latter two liquids is not critical and may range, on a weight basis, from 1 to 99 parts of the former to 99 to 1 part of the latter. If desired, the hydrogen halide of Formula II can be introduced into the suspension of the diphenoquinone of Formula I in a suitable inert solvent for the hydrogen halide, such as the above-mentioned alkanols or as an aqueous solution to give the desired halobiphenol.

The parameters of the invention may also be satisfied by mixing the diphenoquinone with an aqueous solution of the hydrogen halide whereby the diphenoquinone uses the aqueous portion of the hydrohalide solution as the suspending medium. The hydrogen halide addition should continue for a time and at a temperature required to complete the reaction as evidenced by the conversion of preferably all of the diphenoquinone suspension to the desired halobiphenol. The dispersion of the diphenoquinone, because of its insolubility, is readily accomplished by merely mixing the latter with the suspending medium, i.e., the alkanol or water.

We have found that room temperature reactions are usually satisfactory for the purpose. However, in order to increase the rate of reaction and to avoid excess hydrogen halide (which may hinder rapid conversion of the diphenoquinone to a product mixture of a reduced state of coloration indicating completion of the reaction), the temperature of the reaction, which is ordinarily exothermic, can be allowed to rise, for instance, up to 110 to 125° C., to evolve the excess hydrogen halide.

The amount of hydrogen halide used is generally not critical and is usually employed in molar excess over the number of mols of the diphenoquinone used. From 5 to 10 or more mols of hydrogen halide per mol diphenoquinone can be employed for this purpose, with any excess being readily recycled and recovered.

Generally, if there is no halogen in the starting diphenoquinone, the reaction between the diphenoquinone and the hydrogen halide proceeds in a manner to introduce a halogen in the position ortho (the 3-position with respect to the hydroxyl group) to the valence bond between the two phenyl groups. However, it has been found that when R is a tertiary carbon atom attached directly to the aromatic nucleus, for instance, a tertiary butyl group, one of the tertiary butyl groups is eliminated and replaced by the halogen to give a composition, for instance, having the formula (IV) 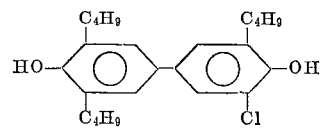

If it is desired to introduce an additional halogen into the halobiphenols prepared in accordance with the present invention, one can reoxidize some of the formed halobiphenol to the corresponding diphenoquinone which in turn can then be subjected to additional treatment in accordance with the present invention to form a higher halogenated biphenol. Thus, by repeated reoxidations and treatment in accordance with our invention, one can obtain higher halogenated biphenols by relatively simple means as contrasted to prior art methods whereby difficulty was encountered in the usual chlorination reaction because of the lack of control of the position where the halogen might enter either the aromatic nucleus or undesirably, enter on the hydrocarbon substituents on the aryl nuclei.

In order that those skilled in the art may better understand how the present invention may be practiced, the following examples are given by way of illustration and not by way of limitation. All parts are by weight unless otherwise stated.

In the following examples, an inert atmosphere, in this instance, a nitrogen blanket, was maintained over the reaction mixture throughout the reaction; the temperature of the reaction was, in some instances, maintained by means of an ice bath.

EXAMPLE 1

A slow stream of gaseous hydrogen chloride was introduced into a stirred suspension of finely ground 3,3',5,5'-tetramethyldiphenoquinone (120 gm.) in commercial grade absolute methanol (2000 ml.). The reaction mixture was kept under a nitrogen blanket and the temperature was held at 15–20° C. After five hours, the reaction mixture, which was clear, was diluted with 5 liters of water to cause deposition of an essentially colorless crystalline precipitate. The precipitate was removed by filtration, dissolved in methanol and reprecipitated by addition of water. The colorless crystalline product, obtained in a yield of 98%, had a melting point of 208–210° C. and was identified by spectroscopic means and by elemental analyses as being 3-chloro-2,2',6,6'-tetramethyl-p,p'-biphenol.

Found (percent): C, 69.73; H, 6.19. Calculated (percent): C, 69.44; H, 6.19.

EXAMPLE 2

Gaseous hydrogen chloride was introduced into a stirred mixture of chloroform (1500) and methanol (1000 ml.) containing 50 gm. of finely ground 3,3',5,5'-tetraphenyldiphenoquinone, which was partly suspended in the aforesaid two liquids. The reaction mixture was kept under a nitrogen blanket and its temperature was held at 20° C. After two hours, the reaction mixture was clear. About 80% of the solvent was then removed from the reaction mixture by vacuum distillation to leave a white crystalline precipitate. Filtration gave 52.5 gm. (97.5% yield) of a crystalline product; recrystallization by dissolving the product in warm chloroform and adding methanol gave 3-chloro-2,2',6,6'-tetraphenyl - p,p' - biphenol melting at 208–210° C. The identity of this material was established by spectroscopic examination and by the following elemental analyses.—Found (percent) C, 82.17; H, 4.51. Calculated (percent): C, 82.35; H, 4.80.

EXAMPLE 3

Hydrogen chloride gas was introduced for 2 hours into a stirred suspension of 3,3',5,5'-tetra-t-butyldiphenoquinone (6.00 gm.) in a mixture of methanol (600 ml.) and chloroform (50 ml.). The reaction mixture was kept under a nitrogen blanket, and the temperature was maintained at 15 to 20° C. The clear solution was stirred for about 18 hours and then subjected to vacuum distillation at room temperature to remove all solvent. The colorless crystalline residue thus obtained was washed with aqueous methanol, and then recrystallized by dissolving in methanol and adding a small amount of water to give a colorless to pale yellow crystalline product, melting at 150–151° C. in about a 75% yield. This product was found by spectroscopic means to be 2-chloro-2',6,6'-tri-t-butyl-4,4'-biphenol and as also evidenced by the following analyses.—Found (percent): C, 73.90; H, 8.64. Calculated (percent): C, 74.11; H, 8.55.

EXAMPLE 4

A solution of 2.4 grams 3,3',5,5'-tetramethyldiphenoquinone in 800 ml. chloroform was added slowly under a nitrogen blanket with stirring to 1000 ml. of methanol into which a constant stream of anhydrous hydrogen bromide gas was being introduced. The temperature of the reaction mixture was maintained at around 20° C. After all the diphenoquinone had been introduced (after about 3 hours), the solvent was removed by vacuum and the crystalline residue was recrystallized by dissolving in methanol in the presence of charcoal followed by dilution of the filtrate with a small amount of water. The resulting colorless crystalline precipitate was isolated, dried and found to melt between 207–210° C. This material was found to be 3-bromo-2,2',6,6'-tetramethyl-p,p'-biphenol as evidenced by spectroscopic data and by elemental analyses.—Found (percent): C, 59.94; H, 5.45. Calculated (percent): C, 59.83; H, 5.33.

The following example shows the effect of operating at elevated temperatures whereby it is possible to obtain the desired reaction product in a relatively short period of time.

EXAMPLE 5

A stream of gaseous hydrogen chloride was introduced into a suspension of 120 grams of 3,3',5,5'-tetramethyldiphenoquinone in 2000 ml. commercial grade methanol. The temperature of the reaction mixture was allowed to rise to about 65° C. and after about 4 minutes of addition, a clear solution was formed. After removing traces of unreacted starting material by filtration, the reaction mixture was diluted with water to give a yield of 97% of essentially pure 3-chloro - 2,2',6,6' - tetramethyl-p,p'-biphenol melting between 206–208° C.

EXAMPLE 6

In this example, 1 part of 3,3',5,5'-tetramethyldiphenoquinone was suspended in 50 parts water and thereafter hydrogen chloride gas was introduced into the suspension during which time the temperature of the reaction rose to about 105° C. After about 16 minutes of introduction of hydrogen chloride, the reaction was substantially completed as evidenced by the formation of a colorless reaction product. The formed 3-chloro-2,2',6,6'-tetramethyl-p,p'-biphenol was obtained (after working up in the same manner as in Example 5) in about a 90% yield based on the theoretical value.

EXAMPLE 7

About 1 part of 3,3',5,5' - tetramethyldiphenoquinone was suspended in 40 parts of ethanol and into this suspension was introduced hydrogen chloride gas. The temperature rose promptly to around 80° C. and after about two minutes of HCl introduction, the gas passage was terminated. The reaction product, which was colorless, was worked up in the same manner as in Example 5 to give essentially pure 3-chloro-2,2',6,6'-tetramethyl-p,p'-biphenol in a yield in excess of 90% of the theoretical value.

EXAMPLE 8

A mixture was prepared of 25 parts water and 20 parts methanol and in this mixture was suspended 1 part 3,3',5,5' - tetramethyldiphenoquinone. Thereafter, hydrogen chloride gas was introduced into the suspension for a period of about 15 minutes during which the temperature rose rapidly to 81° C. At the end of this time, the formed product was analyzed by gas phase chromatography and was found to be the desired 3-chloro-2,2',6,6'-tetramethyl-p,p'-biphenol in about a yield of 70%.

EXAMPLE 9

A suspension of 2-chloro-3,3',5,5'-tetramethyldiphenoquinone (2 grams) in 100 ml. concentrated aqueous hydrogen chloride (37% HCl) was stirred for 2 hours at the end of which time the suspension had turned to a pale yellow color. The precipitate which formed was removed by filtration and recrystallized from aqueous methanol (in the presence of zinc powder in order to remove residual color) to give an almost quantitative yield of 3,3'-dichloro-2,2',6,6'-tetramethyl-p,p'-biphenol, melting at 217–219° C. The structure of the above-mentioned dichlorobiphenol was established by elemental analysis.—Found (percent): C, 62.13; H, 5.22. Calculated (percent): C, 6.75; H, 5.18.

The following examples illustrate the ability to oxidize the formed halobiphenols to the corresponding diphenoquinones which have one more halogen than was present in the diphenoquinone used to make the halobiphenol. Such halodiphenoquinones can be further treated in accordance with our invention to introduce a still further halogen in the form of the biphenol.

EXAMPLE 10

3-chloro-2,2',6,6'-tetramethyl-p,p'-biphenol (600 mg.) dissolved in 50 ml. chloroform was oxidized for 50 minutes with lead dioxide (10 grams) by stirring the ingredients at room temperature for the designated period of time. The reaction mixture was filtered, the filtrate was evaporated and the solid residue was treated with methanol to give dark, purple crystals which were recrystallized by dissolving them in a small amount of chloroform and thereafter adding methanol to precipitate the crystals. There was thus obtained 2-chloro-3,3',5,5'-tetramethyldiphenoquinone as evidenced by spectroscopic data and by the elemental analyses.—Found (percent): C, 70.01; H, 5.45. Calculated (percent): C, 70.02; H, 5.51.

EXAMPLE 11

3-bromo-2,2',6,6' - tetramethyl-p,p'-biphenol was oxidized with lead dioxide in a chloroform solution in the same manner as was carried out in Example 10. The resulting 2-bromo-3,3',5,5'-tetramethyldiphenoquinone was recrystallized by dissolving in a small amount of chloroform and adding methanol. This gave deep-red to purple, needle-shaped crystals which were identified as the desired product by spectroscopic examination and by the following analytical data. Found (percent): C, 59.82; H, 4.74. Calculated (percent): C, 60.20; H, 4.75.

EXAMPLE 12

The oxidation of 3 - chloro-2,2',6,6'-tetraphenyl-p,p'-biphenol with lead dioxide was carried out in the same fashion as described in the preceding Example 10 to yield deep-green colored crystals of 2-chloro-3,3',5,5'-tetraphenyldiphenoquinone melting at 230–232° C. The identity of this diphenoquinone was established by spectroscopic data and also by the following elemental analyses.—Found (percent): C, 82.60; H, 4.51. Calculated (percent): C, 82.67; H, 4.43.

EXAMPLE 13

The oxidation of 2-chloro-2',6,6'-tri-t-butyl-p,p'-biphenol was carried out in the same manner as described in Example 10. The 3 - chloro - 3',5,5' - tri - t - butyldiphenoquinone thus obtained was in the form of deep-purple crystals melting at around 150° C. The identity of the diphenoquinone was established by spectroscopic data and by the following elemental analyses.—Found (percent): C, 74.20; H, 7.96. Calculated (percent): C, 74.49; H, 8.07.

The halobiphenols of the present invention can be reacted with aromatic acyl halides, e.g., phthaloyl halides to make polyesters having intrinsic viscosities of at least 0.1 and generally in excess of 0.5 wherein the melting point of these polyesters is within the range suitable for most molding applications. These polyesters may be considered as being composed of recurring structural units of the formula

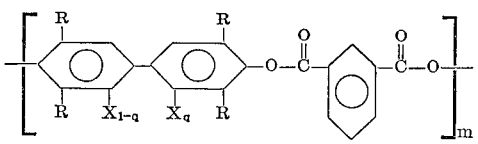

and (VI)

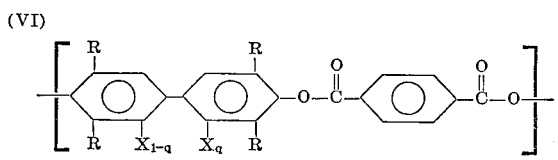

where R and X have the meanings given above, $q$ is 0 or 1, and $m$ is a whole number in excess of 1, for instance, 10 to 10,000 or more. The halogen designations X are provided with subscripts because of the possibilities that esterification has two opportunities to establish a recurring unit, depending on which phenyl group of the biphenol has the single halogen thereon.

These units in the form of long molecular chains can be joined in a variety of ways. For example, they can be in a random pattern, a block pattern, and a regular pattern. The pattern of the units and the ratio of the units can be controlled by the order of reaction and the amount of the reactants. The polymer molecule containing both units can be represented by the formula (VII)

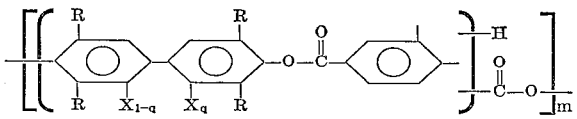

where R, X, $q$, and $m$ have the meanings given above. The total number of such units in the polyesters is preferably at least 25 or higher. Generally the intrinsic viscosity is a more meaningful number of indicating molecular weight due to the uncertainty of determining the actual number of units in a molecule, which at best is an average value of approximate magnitude. The intrinsic viscosity of these polymers (the process for measuring such intrinsic viscosity being described on p. 309 of the book by P. J. Flory, "Principles of Polymer Chemistry," Cornell University Press, Ithaca, N.Y. (1953), is generally measured at a temperature of 25° C. while dissolved in a chlorinated solvent.

Preferably the phthaloyl halide is either isophthaloyl chloride or terephthaloyl chloride. The particular halobiphenol used may be any one of those coming within the scope of Formula III, examples of the preparation of which are found earlier in this application.

Generally these polyesters are prepared by the reaction in a suitable solvent, particularly, solvents such as dichlorobenzene, tetrachloroethane, m-terphenyl, chlorinated biphenyls, brominated biphenyls, diphenyl oxide, biphenyl, brominated diphenyl oxide, etc., by heating the mixture of the halobiphenol and the phthaloyl halide at temperatures in the range of about 75° C. up to the reflux temperature of the solution until the evolution of hydrogen halide is at least substantially completed. Thereafter, the polyesters thus formed can be used in solution form as made by the above process, or the polymer can be isolated by adding a non-solvent to the polymer to precipitate the latter.

The polymers of the polyester thus obtained from phthaloyl halides can be composed solely of residues of the halobiphenol and a single phthaloyl halide or they can be formed of blocks of the halobiphenol reacted in one instance with isophthaloyl halide, and in another instance with the terephthaloyl halide so that recurring units of Formulas V and VI are concurrently present. Generally, the mixed polyester may contain from 1 to 99 mol percent of the m-phenylene isophthalate unit to 99 to 1 mol percent of the p-phenylene terephthalate unit.

A still further class of polyesters which may be made from the halobiphenols of the present invention may be characterized as being composed of recurring structural units having the general formula (VIII)

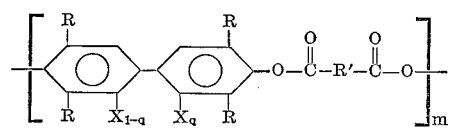

where R, X, $q$, and $m$ have the meanings given above and R' is a divalent saturated aliphatic radical of from 2 to 12 carbon atoms. Such polyesters can be prepared by effecting reaction between a biphenol of the formula (IX)

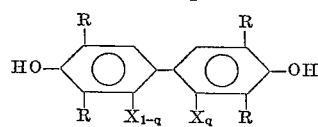

and a diacyl compound of the formula (X)

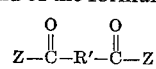

where Z is a member selected from the class consisting of the hydroxyl group and halogens, for instance chlorine, bromine, etc. Included among such diacyl compounds may be mentioned succinic acid, succinyl chloride, adipic acid, azelaic acid, suberic acid, sebacic acid, azeloyl chloride, adipoyl chloride, sebacyl chloride, etc.

Again, these aliphatic polyesters can be prepared in the same manner as the phthaloyl esters previously described by effecting reaction between the halobiphenol of Formula III with the aliphatic diacyl compound of Formula X in approximately equimolar concentrations employing where desired the usual esterification catalysts for the purposes at temperatures within the range between 50 to 200° C. Typical of the polyesters which can be prepared is that derived from the reaction of adipoyl chloride and 3-chloro-2,2',6,6'-tetramethyl-p,p'-biphenol which can be formed into polyesters composed of recurring structural units of the formula (XI)
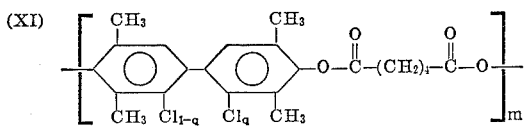

where $q$ has the meaning above and $m$ is a whole number in excess of 1. These polyesters have the same utiltiy as the polyesters derived from the phthaloyl halides previously described. Because of the presence of the aliphatic substituent derived from the precursor diacyl aliphatic compound, it has been found that such polyesters have lower molding temperatures and greater solubility in a large number of solvents and for this reason the more amenable to film and fiber formation.

Additionally, the halobiphenols of the present invention can be formed into polycarbonate resins with carbonate precursors such as phosgene or carbonate esters. Such polycarbonate resins will be composed of recurring structural units of the general formula (XII)
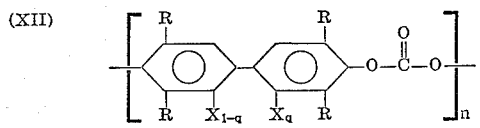

where R, X and $q$ have the meanings above and $n$ is a whole number in excess of 1, e.g., 10 to 10,000 or more. Such polycarbonate resins are obtained by effecting reaction between the halobiphenol and a carbonate precursor, such as phosgene, diphenyl carbonate, a bischloroformate, etc. More particular directions for making polycarbonate resins which can use the halobiphenols of the present invention can be found in U.S. Pat. 3,028,365, issued Apr. 3, 1962.

When making polycarbonate resins, in addition to using the halobiphenols of the present invention, other dihydric phenols can be employed as, for instance, other non-halogenated or halogenated biphenols such as hydroquinone, resorcinol, chlorohydroquinone, 4,4'-dihydroxybiphenyl ether, 4,4'-dihydroxy-2,6-dimethyldiphenyl ether, 4,4'-dihydroxy-2,3'-dibromodiphenyl ether, 2,2-bis-(4-hydroxyphenyl)propane (known as bisphenol-A), bis-(4-hydroxyphenyl) methane, etc.

Additionally, these polycarbonate resins can be further modified by the introduction of carboxylate groups of the formula

in which at least some of the carboxylate groups and at least some of the carbonate groups are bonded directly to carbon atoms of aromatic carbocyclic groups. Such copolyesters are prepared by reacting as essential ingredients a difunctional carboxylic acid or acyl halide, a halobiphenol described in the present invention, and a carbonate precursor. Such copolyesters can be prepared in accordance with the method described in U.S. Pat. 3,169,121, issued Feb. 9, 1965. Again, the molar ratio of the polyester units and of the polycarbonate units can be varied widely and can be as high as 99 mol percent of one recurring unit as contrasted to as low as 1 mol percent of the other recurring unit.

It has also been found that the combination of halobiphenyl phthalate resins with the usual polycarbonate resins made from bisphenol-A lowers the glass transition temperature ($T_G$) favorably of the polyester and permits molding thereof to give products having unusually good properties.

Epoxy resins may also be made by reacting 1 mol of the halobiphenol prepared in accordance with the present invention with 2 or more mols of a epichlorohydrin, depending upon whether a liquid or solid epoxy resin is desired, the larger amount giving the more fluid resins. Any excess epichlorohydrin acts as a solvent and is recovered from the polymer mixture. The reaction is generally carried out by heating at from 100° C. up to the reflux temperature with the slow addition of caustic to react with the hydrochloric acid evolved and to maintain the reaction mixture approximately neutral. The glycidol polyether intermediate may be further reacted with other compounds containing active hydrogen, e.g., other mono-, or polyhydric phenols, phenol-aldehyde resins, mono-, and polyhydric alcohols, amines, amides, ureas, urea-, aldehyde resins, melamines, melamine-aldehyde resins, polyvinyl chloride, etc., to produce modified polymers. Such modifiers may be reacted as a separate step or along with the curing step in which the epoxy resin is cured with a polycarboxylic acid. Other modifications and retails are found, for example, in "Epoxy Resins," by Lee and Neville, McGraw-Hill Book Company, Inc., New York (1957).

The following examples illustrate the preparation of polymeric materials from the halobiphenols prepared in accordance with the present invention.

EXAMPLE 14

To a reaction vessel equipped with a stirrer, condenser, and thermometer were charged 2.77 grams (0.01 mol) 3-chloro - 2,2',6,6' - tetramethyl-p,p'-biphenol, 2.03 grams (0.01 mol) isophthaloyl chloride, 19 grams o-dichlorobenzene (solvent) and 10 mg. of zinc dust (as catalyst). The mixture was heated to reflux temperature and after heating at this temperature for about 30 minutes a viscous solution was obtained at which time 6 grams of additional o-dichlorobenzene were added and the heating continued for 30 minutes more, and thereafter the mixture was cooled. The solution was filtered to remove the zinc dust and the polymer was precipitated in methanol, washed with acetone, and dried in a vacuum oven for about 18 hours at 160° C. to give a poly-(3-chloro-2,2',6,6'-tetramethyl-p,p'-biphenyl)isophthalate containing about 8.8 percent chlorine and being composed of recurring structural units of the formula (XIII)
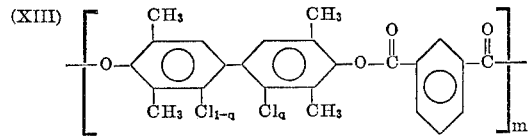

where $q$ is 0 or 1, and $m$ is a whole number in excess of 1. This polymer had an intrinsic viscosity of about 0.7 when measured in methylene chloride at about a 25 percent solids concentration at 25° C.

EXAMPLE 15

To a reaction vessel equipped with a stirrer, condenser, and thermometer were charged 3.18 grams of 3-chloro - 2,2',6,6' - tetraphenyl-p,p'-biphenol, 1.23 grams isophthaloyl chloride and 17 grams of chloroinated biphenyl as solvent. The mixture was slowly heated to 240–250° C. when HCl began to be evolved and then heated to a temperature of 340° C. for one half hour. The solution was cooled to give a gelatinous type polymer at room temperature. The contents were then washed with methanol and acetone, dried in a vacuum oven at 150° C. for about 18 hours to give a poly-(3-chloro-2,2',6,6'-tetraphenyl-p,p'-biphenyl)isophthalate composition having an intrinsic viscosity of 0.71 and being composed of recurring structural units of the formula

XIV

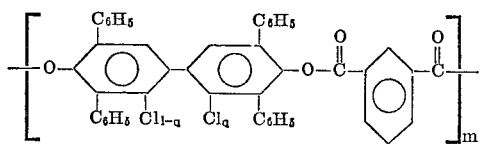

where $q$ is 0 to 1 and $m$ is a whole number in excess of 1.

EXAMPLE 16

This example illustrates the preparation of a mixed polymer specifically poly-(3-chloro-2,2',6,6'-tetraphenyl-p,p'-biphenyl)isophthalate-terephthalate wherein the molar concentrations of the isophthalate and terephthalate units were in the ratio of 75/25. More particularly, a reaction vessel similar to that used in the preceding examples was charged with 3.12 grams 3-chloro-2,2',6,6'-tetraphenyl-p,p'-biphenol, 0.905 gram isophthaloyl chloride, 0.31 gram tetraphthaloyl chloride, 17 grams o-dichlorobenzene and 10 mg. zinc powder. The mixture was heated at the reflux temperature of the mass and maintained at this temperature (about 180° C.) for 6½ hours to yield a viscous solution which when cooled to room temperature was then filtered to remove the zinc dust. The polymer was precipitated by the addition to methanol, and the solid material thus obtained was dried in a vacuum for about 18 hours to yield the abovementioned polymer having an intrinsic viscosity of 0.37. This polymer contained about 5.6 percent chlorine and was composed of recurring structural units for formula XIV and (XV)

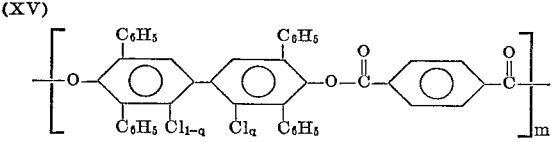

where $q$ is 0 or 1 and $m$ has the meaning above.

EXAMPLE 17

This example illustrates the preparation of a polycarbonate resin from one of the biphenols herein described. A mixture of 2.77 grams of 3-chloro-2,2',6,6'-tetramethyl-p,p'-biphenol, 80 ml. water, 21 ml. of a 1 M sodium hydroxide solution, 0.2 gram benzyltriphenylphosphonium chloride, 0.1 gram sodium bisulfite and 5 ml. methylene chloride were added to a mixer maintained under a nitrogen blanket and the mixture was rapidly stirred for a period of about seven minutes when a solution of 3.4 grams of the chloroformate of 2,2-bis(4-hydroxyphenyl) propane and 50 ml. of methylene chloride were added. Stirring was continued for another five minutes after the addition was complete to yield a reaction product which was washed twice in methanol and dried for about 18 hours in a vacuum oven at about 60° C. This gave a poly-[3-chloro - 2,2'-6,6' - tetramethyl-p,p'-biphenylcarbonate-co - 2,2 - propane-bis(4-phenylcarbonate)] in which the units were essentially present in equimolar quantities. Films were cast from this polymer from a methylene chloride solution and then heated at elevated temperatures to give flexible, flame-resistant films. This polymer was found to contain 7.79 percent chlorine and was composed of recurring units of the formulas (XVI)

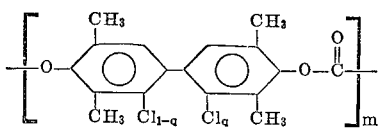

and (XVII)

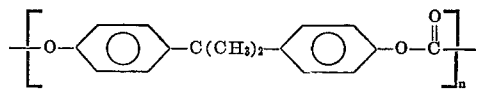

where $q$ is 0 or 1 and $m$ is a whole number in excess of 1 and $n$ is also a whole number in excess of 1.

EXAMPLE 18

Poly-(3-chloro-2,2',6,6' - tetramethyl - p,p'-biphenyl) isophthalate-co-2,2-propane bis(4-phenylisophthalate) in a molar ratio of 50 mol percent of each of the isophthalate units was prepared as follows: 1.39 grams of 3-chloro-2,2',6,6' - tetramethyl - p,p' - biphenol, 1.15 grams 2,2-bis(4-hydroxyphenyl) propane, 8 ml. water, 22 ml. of a 1 M sodium hydroxide solution, 0.1 gram sodium bisulfite and 0.15 gram benzyltriphenylphosphonium chloride, and 15 ml. of a surfactant (Duponol ME) were placed in a mixer blanketed with nitrogen. The mixture was stirred and a solution of 2.03 grams of isophthaloyl chloride in 60 ml. of o-dichlorobenzene was added rapidly. Stirring was continued for about 15 minutes followed by precipitation of polymer with acetone. The polymer was washed twice with acetone and then three times with water, and dried in a vacuum oven for about 18 hours at around 60° C. The above-identified polymer was found to have an intrinsic viscosity $\eta=0.53$ when measured in chloroform and contained 4.7 percent chlorine. A film cast from this polymer from methylene chloride solvent and thereafter heated gave a clear, strong, flexible film.

All the polymers described in Examples 14 to 18 when evaluated as thin films, although they burned in a flame, they were rapidly self-extinguishing when removed from the flame. In contrast to this, corresponding polycarbonate resins, polyphenylene oxide resins, and a non-chlorinated analogue of Example 14 continued to burn when removed from the flame. This indicated that even though the amount of chlorine present in the polymer was relatively low, extremely good flame extinguishing properties were imparted by the presence of the single chlorine in the recurring unit.

The polymers previously described or referred to in the foregoing examples can be blended with other polymeric compositions in amounts ranging from about 1 to 99 percent, by weight, of the former to about 99 to 1 percent, by weight, of the other polymer. Among the polymers which can be blended with polymeric compositions made from the biphenols of the present invention may be mentioned other polycarbonate resins free of the halobiphenyl units such as those made from diphenyl carbonate and bisphenol-A, polyphenylene oxide resins such as the poly(2,6-dimethylphenylene-1,4) ethers more particularly described in U.S. 3,306,875, issued Feb. 28, 1967 and assigned to the same assignee as the present invention, aromatic polyesters such as those described in the above-mentioned Kantor and Holub patents, polystyrene, polyvinyl chloride, polyethylene, chlorinated polyethylene, etc.

It will of course be apparent to those skilled in the art that in making the halogenated biphenols, other diphenoquinones and other hydrogen halides may be employed in addition to those described in the foregoing examples without departing from the scope of the invention. Furthermore, the conditions of reaction are not critical and can be varied widely, including the use of different non-reactive solvents for making the solution of the diphenoquinone and also for the suitable solvent for the halide.

The halobiphenols prepared in accordance with the present invention can be used as plasticizers for polyurethane resins, as rubber antioxidants, etc. Because of their physical, mechanical, chemical, electrical, and thermal properties, the polymers derived from the halobiphenols prepared in accordance with the present invention have many and varied uses. For example, they can be used in molding powder formulations either alone or mixed with various fillers (e.g., TiO₂, graphite glass fibers, etc.), to make molded parts and articles, such as gears, bearings, cams, gaskets, valve seats, containers, washing machine agitators, and the like. They can be used to prepare molded, calendered or extruded articles, films, coatings, threads, filaments, tapes, and the like. They can be applied to a broad spectrum of uses in the form of sheets, rods, tapes, and the like and are useful in electrical applications.

The polymers herein derived can be advantageously employed in one or more decorative, protective, structural, bonding capacities to provide unique structural elements. Films formed from the polymers of this invention by conventional techniques are useful as wrapping or packaging materials, as liners for containers, covers, closures and the like, as electrical insulating tapes, pipe coverings, etc. They can also be used as insulating material for electrical conductors such as wire and cable, as slot insulation in dynamo-electric machines, as surface coverings for appliances, as coatings for rods, wire enamels, varnishes, and paints, etc.

The diphenoquinones produced in accordance with the present invention have many uses. As described above, they can be used as chemical intermediates in the preparation of other materials, particularly the above-mentioned biphenols. More particularly, the diphenoquinones can be reduced to dihydroxy compounds of the biphenol type which makes them useful in preparing epoxide, polyester, polycarbonate, etc. resins. Additionally, these diphenoquinones can be used as dyes, as antioxidants, and as inhibitors against polymerization of olefinic monomeric materials such as styrene, methyl methacrylate, etc., where it is desired to avoid premature polymerization of these monomers.

Obviously, other modifications and variations of the present invention are possible in light of the above teachings and disclosures. It is, therefore, to be understood that changes may be made in the particular embodiments of the invention described which are within the full intended scope of the invention as defined by the appended claims.

What we claim as new and desire to secure by Letters Patent of the United States is:

1. The process for forming a monohalogenated organo-substituted biphenol from a tetra-organo-substituted diphenoquinone which comprises effecting reaction at a temperature from 15° to 125° C. between a hydrogen halide of the formula HX with a tetra-organosubstituted diphenoquinone of the general formula

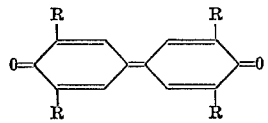

while the aforesaid diphenoquinone is suspended in a liquid medium selected from the class consisting of water, methanol, and mixtures of water and said methanol, where R is the same or different monovalent hydrocarbon radicals selected from the class consisting of the methyl and phenyl radicals, and X is a halogen of the class of chlorine, bromine, and fluorine.

2. The process as in claim 1 wherein the diphenoquinone is 3,3',5,5'-tetramethyldiphenoquinone and the halobiphenol obtained is 3-chloro-2,2',6,6'-tetramethyl-p,p'-biphenol.

3. The process as in claim 1 wherein the diphenoquinone is 3,3',5,5'-tetraphenyldiphenoquinone and the formed halobiphenol obtained is 3-chloro-2,2',6,6'-tetraphenyl-p,p'-biphenol.

4. The process as in claim 1 wherein the diphenoquinone is 3,3',5,5'-tetra-t-butyldiphenoquinone and the halobiphenol formed is 2-chloro-2',6,6'-tri-t-butyl-p,p'-biphenol.

5. A process as in claim 1 wherein the diphenoquinone is 3,3',5,5'-tetramethyldiphenoquinone, the suspending medium is methanol and the hydrogen halide is hydrogen chloride.

6. A process as in claim 1 wherein the diphenoquinone is 3,3',5,5'-tetraphenyldiphenoquinone, the suspending medium is methanol and the hydrogen halide is hydrogen chloride.

7. A process as in claim 1 wherein the diphenoquinone is 3,3',5,5'-tetraphenyldiphenoquinone, the suspending medium is methanol and the hydrogen halide is hydrogen bromide.

8. A process as in claim 1 wherein the diphenoquinone is 3,3',5,5'-tetramethyldiphenoquinone, the suspending medium is water and the hydorgen halide is hydrogen chloride.

9. The process for converting a tetra-organosubstituted diphenoquinone to a monohalogenated organosubstituted biphenol which comprises (1) forming a suspension of a tetra-organosubstituted diphenoquinone of the general formula

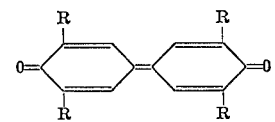

in a liquid medium selected from the class consisting of water, methanol, and mixtures of water and said methanol and (2) introducing into the suspension a gaseous hydrogen halide of the formula HX, the addition of the hydrogen halide being carried out for a time and at a temperature of from 15° to 125° C. required to form a monohalogenated organosubstituted biphenol, where R is the same or different monovalent hydrocarbon radicals selected from the class consisting of the methyl and phenyl radicals, and X is a halogen of the class of chlorine, bromine, and fluorine.

10. The process which comprises effecting reaction at a temperature of from 15° to 125° C. between a methanol suspension of a diphenoquinone of the general formula

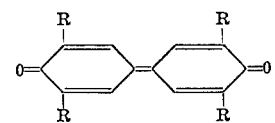

and gaseous hydrogen chloride to obtain a monohalogenated biphenol, where R may be the same or different monovalent hydrocarbon radicals selected from the class consisting of the methyl and phenyl radicals.

11. The process which comprises effecting reaction at a temperature of from 15° to 125° C. between a water suspension of a diphenoquinone of the general formula

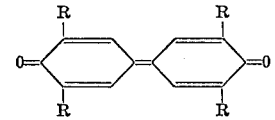

and gaseous hydrogen chloride to obtain a monohalogenated biphenol, where R may be the same or different monovalent hydrocarbon radicals selected from the class consisting of the methyl and phenyl radicals.

12. A halohydrocarbon-substituted biphenylene composition selected from the class consisting of 3-chloro-2,2', 6,6'-tetraphenyl-p,p'-biphenol; 2-chloro-2', 6,6'-tri-t-butyl-p,p'-biphenol; and 3,3'-dichloro-2,2',6,6'-tetramethyl-p,p'-biphenol.

13. A biphenylene composition as in claim 12 which is 3-chloro-2,2′,6,6′-tetraphenyl-p,p′-biphenol.

References Cited

UNITED STATES PATENTS

| | | | |
|---|---|---|---|
| 3,262,982 | 7/1966 | Hay | 260—620 X |
| 3,306,875 | 2/1967 | Hay | 260—620 X |
| 3,491,128 | 1/1970 | Deuhurst | 260—620 X |

OTHER REFERENCES

Auwers et al., Berichte, vol. 38 (1905), 226–237.

BERNARD HELFIN, Primary Examiner

U.S. Cl. X.R.

44—78; 117—127; 252—404; 260—47 X A, 396 R, 47 C, 348 R, 860, 31.8 R